United States Patent [19]

Nguyen et al.

[11] Patent Number: 4,530,961

[45] Date of Patent: Jul. 23, 1985

[54] LOW VISCOSITY STABLE AQUEOUS DISPERSION OF GRAFT CARBON BLACK

[75] Inventors: Van T. Nguyen, Cruseilles, France; Günter Bellmann, Commugny, Switzerland; Francoise Boussel, Saint-Julien en Genevois, France

[73] Assignee: Battelle Memorial Institute, Geneva, Switzerland

[21] Appl. No.: 598,351

[22] PCT Filed: Jul. 6, 1983

[86] PCT No.: PCT/EP83/00175

§ 371 Date: Mar. 9, 1984

§ 102(e) Date: Mar. 9, 1984

[87] PCT Pub. No.: WO84/00372

PCT Pub. Date: Feb. 2, 1984

[30] Foreign Application Priority Data

Jul. 9, 1982 [FR] France .............................. 82 810295

[51] Int. Cl.$^3$ ....................... C09D 11/02; C09D 11/10
[52] U.S. Cl. ...................................... 524/832; 106/20; 260/DIG. 38; 523/160; 523/161
[58] Field of Search ................. 260/DIG. 38; 106/20; 523/160, 161; 524/832

[56] References Cited

U.S. PATENT DOCUMENTS

| | | | |
|---|---|---|---|
| 3,903,034 | 9/1975 | Zabiak et al. | 260/DIG. 38 |
| 3,904,568 | 9/1975 | Yamaguchi et al. | 524/832 |
| 3,919,150 | 11/1975 | Kiel et al. | 523/160 |
| 4,018,728 | 4/1977 | Priest | 523/160 |
| 4,395,515 | 7/1983 | Dinklage et al. | 524/832 |

FOREIGN PATENT DOCUMENTS

| | | |
|---|---|---|
| EP18558 | 4/1980 | European Pat. Off. . |
| 1537176 | 8/1968 | France . |
| 56-147869 | 11/1981 | Japan . |
| 1191872 | 5/1970 | United Kingdom . |
| 1421529 | 1/1976 | United Kingdom . |

OTHER PUBLICATIONS

Chemical Abstracts, vol. 76, No. 4, Jan. 24, 1972, abstract No. 15400Y.
Chemical Abstracts, vol. 79, No. 24, Dec. 17, 1973, abstract No. 138303P.

Primary Examiner—Ronald W. Griffin
Attorney, Agent, or Firm—Karl F. Ross; Herbert Dubno

[57] ABSTRACT

Aqueous dispersion of carbon black grafted with hydrophilic monomers such as alkali or ammonium carboxylate bearing polymers. The dispersion has a viscosity of about 2 to about 30 cP for a carbon black content of about 1–15% by weight.

22 Claims, No Drawings

LOW VISCOSITY STABLE AQUEOUS DISPERSION OF GRAFT CARBON BLACK

The present invention relates to an aqueous suspension or dispersion of carbon black and, more especially to an aqueous suspension of carbon black the particles of which are grafted with chemically bonded hydrosoluble polyolefinic chains, preferably polymers or copolymers of acrylic monomers and, more particularly, ammonium and alkali metal polyacrylates. In the present disclosure, the word "polyolefine" designates free radical polymerizable double-bonded monomers carrying water solubilizing functions. Details on such monomers are provided hereafter.

The invention also concerns a method for preparing such an aqueous suspension and the use thereof for manufacturing ink compositions, namely inks for jet-printing with jet-printing machines.

It is well known that jet-printing imposes certain difficulties depending upon the ink compositions to be used. For instance, such inks must have a high optical density, i.e. contain a relatively high concentration of carbon-black and simultaneously show a very low viscosity and surface tension, i.e. of the order of 1.5 to 10 cP and 30 to 50 dynes.cm, respectively. Also, the carbon-black particles ought to be very fine so as to preferably pass freely through fine filters, e.g. 1 to 50$\mu$ mesh filters. Further, in such suspensions, the carbon-black particles should not settle with time, i.e. they should remain in suspension for extended periods.

Carbon-black being essentially hydrophobic, attempts have been made to attain the above-mentioned properties by grafting water soluble polymeric radicals onto the carbon black particles thus making them water compatible and freely dispersible in water.

Thus, in Japanese (opi) Patent Application No. 80,147561 (C.A. 94, 192963) there is disclosed the grafting of carbon black particles with acrylic acid in ethanol in the presence of $\alpha,\alpha'$-azoisobutyronitrile (AIBN) and under irradiation. The thermal grafting and polymerization of acrylate esters on carbon black is also disclosed in C.A. 94, 48453. In Japanese (opi) Application No. 74,81038, there is disclosed the polymerization and grafting of styrene on carbon black in the presence of AIBN at 140° C. (C.A. 82, 163002) and in Japanese Patent Publication No. 74,11557 (C.A. 81, 106311) there is disclosed the polymerization and grafting on carbon black of acrylonitrile in the presence of AIBN in DMF. In DOS 2,130,617 (C.A. 76, 113947), there is described the direct grafting on carbon black of prepolymerized monomers and in Japanese Patent Publication No. 71,26970 as well as in GB-A-No. 1,191,872, there is described the manufacture of carbon black with grafted acrylic acid and butyl acrylate copolymers in methyl-isobutylketone and other organic solvents. Such grafted carbon black can be easily dispersed in aqueous ammonia solutions.

In GB-A No. 1,421,529 there is disclosed the suspension polymerization into granules of olefinically unsaturated monomers in aqueous media in the presence of carbon black and appropriate surfactants. After polymerization, the formed polymer beads having the carbon black incorporated therein are separated from the water phase and expanded.

The above techniques are effective but they either provide no homogeneously dispersed hydrophilized carbon black particles or they rely on the use of organic or aqueous-organic solvants for undertaking the grafting of the carbon black particles. Yet, when such grafted particles must be used in aqueous jet-ink formulations, the organic solvents must first be removed and the particles must be redispersed in the aqueous media suitable for such inks. Now, it has been found that such a method is tedious and that the grafted particles do not disperse sufficiently well in the jet-ink formulations for providing compositions suitable for being used in jet-printing machines.

Consequently, it was desirable that grafting and polymerization be carried out in water in such manner that a suitable aqueous dispersion or suspension of grafted carbon black be obtained which, afterwards, can be directly converted into a jet-ink composition by the addition of the usual additional jet-ink components. It was further desirable that aqueous suspensions or dispersions of carbon black particles be obtained, the particles of which are rendered sufficiently hydrophilic to become highly water compatible and thus provide very low viscosity solutions even at high solid content. In such cases, the solubilizing power of the groups grafted on the particles is so great that dispersions very near to real solutions are involved. The aqueous suspension of grafted carbon black of the invention has been obtained in this manner. It is characterized by the following parameters: its concentration by weight of grafted carbon black is from about 1 to 15% and its viscosity is from about only 2 to 30 cP at room temperature. The weight amount of water solubilizing grafted polymer or copolymer chains is preferably from about 0.0001 to about 0.002 g (or 0.1 mg to 2 mg) per square meter of the surface of the carbon black particles which is indeed an extremely small amount relative to the teaching of the prior art. Since the weight required of carbon black particles for making 1 $m^2$ varies from about 0.003 g to about 0.16 g, depending on the kind and grade, the weight of grafted material per gram of carbon black will be from about 0.0006 to 0.6 g; however, carbon blacks of grades ranging from 15 to 150 $m^2/g$ (i.e. 0.006 to 0.06 $g/m^2$) are usually preferred. The number of monomer units linked together in the grafted chains is preferably from about 20 to 200. The length of the grafted chains should be sufficient to therefore provide adequate "solubility in water" (i.e. remarkably good dispersibility of the grafted particles) but not too great to avoid too large molecular weights with consequent too high viscosity and filterability problems. This also contrasts with the prior art where simultaneous grafting and polymerization to high polymers occurs thus preventing the formation of "near solutions" of carbon black in water like in the invention. With the above range of grafted chains, the present suspension filters rapidly through a 10$\mu$ mesh screen and slowly but acceptably through a 1$\mu$ mesh screen (for instance at a rate of 0.1 to 10 ml/min depending on pore size). It is believed that the polyacrylate chains do crimp or coil at short distance from the carbon black surface and pack over such surface with the carboxylate functions pointing radially toward the outside thus providing the right solubility properties, this being so when the pH is kept preferably between about 5 and 9. Indeed, it has been shown that outside this pH range, the present dispersion looses somewhat its desirable properties (e.g. sedimentation may occur). It is particularly remarkable that hydrophobic carbon black particles can be made so well dispersible, i.e. nearly soluble, in water with grafted quantities of acrylate as low as about a tenth of a milligram per square meter of the carbon black. Naturally, the aforementioned parameters are not critically limiting and can exceed or fall short of the above mentioned ranges without departing from the scope of the invention.

The method of preparation of the aqueous dispersion of grafted carbon black of the invention comprises treating carbon black in water with a water soluble peroxide and, after peroxidation, adding a water soluble acrylic monomer and a further amount of peroxide, whereby homogeneous free radical polymerization of the monomer and grafting on the carbon black particles will occur simultaneously. The reaction may be carried out in the absence or in the presence of a free radical polymerization accelerator, for instance an amine accelerator.

Regarding mechanistic considerations pertaining to radical grafting on carbon black, the following information can be provided.

Carbon black is essentially composed of carbon particles of generally spherical shape bearing boundary oxygenated functions such as carboxylic, phenolic and quinonic functions.

The phenolic and quinonic functions can act as polymerization quenchers as they will form, when reacting with initiators (for instance $\cdot CH_2-CH_2R$), stabilized radicals (unreactive) viz.

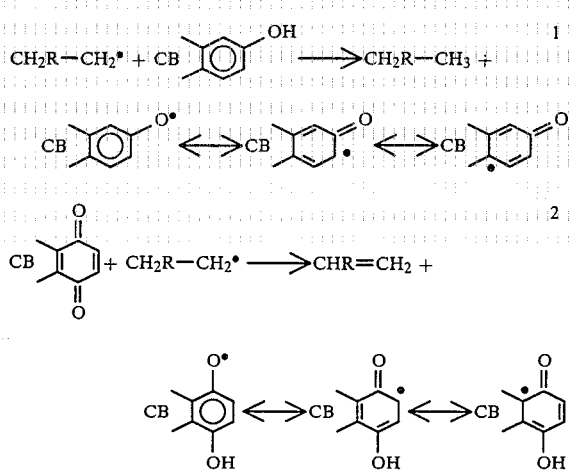

In contrast, peroxides (for instance RCO—O—O—COR) will probably predominantly react as follows:

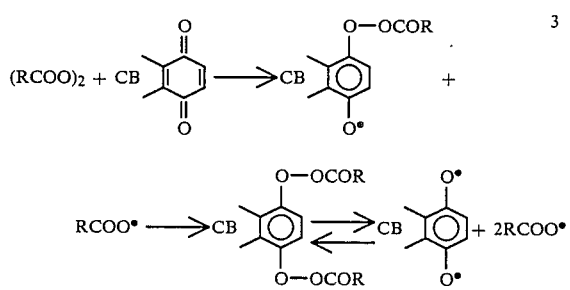

The radicals formed in reaction 3 will therefore promote olefinic polymerization instead of inhibiting it as in reactions 1 and 2.

The peroxides used in the present method are water soluble peroxides such as ammonium and alkali metal persalts, e.g. sodium, potassium and ammonium persulfate and the corresponding perphosphates, perborates and the like; alkali metal peroxides and hydrogen peroxide can also be used. Other peroxide initiators suitable in the present invention are listed in Encyclopedia of Polymer Science & Technology, vol. 2, Interscience Publishers, p. 230–233, (1965).

The polymerizable olefinic monomers usable in the present method are preferably the water soluble acrylic monomers such as the alkali metal and ammonium acrylates and methacrylates unsubstituted or substituted by water solubilizing functions such as hydroxylic, ketonic and nitrile functions. Of course, alkali metals include sodium, potassium, lithium and higher molecular weight alkali metals; ammonium includes the group $N^+H_4$ and $N^+R_4$ in which R can be hydrogen or alkyl groups commonly found in current chemical practice. Substituted and unsubstituted acrylic and methacrylic acid compounds with unsalted free carboxylic groups are also usable but less preferred as the viscosities of the resulting graft carbon black aqueous dispersions thus obtained are not as low as when using the monomers in the alkali salt form. Furthermore, it was found that when treating such free COOH containing graft carbon black aqueous dispersions with alkali metal hydroxide in view of obtaining dispersions identical with that obtained directly with the alkali salt monomers, viscosities increased quite unexpectedly instead of decreasing. In addition, other water soluble vinyl monomers such as acrylamide, methacrylamide, N-vinyl-pyrrolidone and hydroxyethyl acrylic acid are also possible preferably in admixture with the aforementioned acrylates. Some further monomers usable in this invention are listed in the aforementioned Encyclopedia of Polymer Science & Technology reference.

The carbon black can be selected from various sources and include the usual types of carbon black, namely channel black, thermal black, lamp black and furnace black. Furnace black is preferred. Reference showing carbon usable in this invention are: DONNET and VOET: Carbon Black Physics, Chemistry and Elastomer Reinforcement, Marcel Dekker Inc., (1976).

If accelerators are used in the present method, commonly available free radical polymerization accelerators can be used; amine accelerators are convenient such as tetramethyl ethylenediamine, pentamethyl diethylene tetramine, hexamethyl triethylene pentamine and the like.

For carrying out the present simultaneous polymerization and grafting of carbon black with olefinic monomers, it is preferable to agitate the ingredients in water at a temperature of 50° C. to 100° C., preferably at reflux temperature. The reaction time is from about 1 hr to about 60 hrs at reflux temperature although longer reaction times are not harmful but not economical. After cooling, the ungrafted homopolymer which is produced as a by product can be removed by usual techniques, e.g. freeze drying, centrifugation or dialysis but, for most uses, this is not necessary, the presence of such homopolymers not being detrimental for further uses of the grafted carbon black dispersion in jet-ink compositions. On the contrary, the presence of the homopolymers in the solution will serve as a binder ingredient useful for improving the adhesion of the ink on the printed surfaces and the cohesion of the carbon black particles together. This factor was unexpected and surprising and provides a considerable advantage to the dispersion of the invention over the prior art compositions in jet-ink applications.

The quantities of reagents to be used in the method of the invention are as follows: in the first peroxidation stage, there can be used for 100 g of carbon black from about 10 to 50 g of peroxide counted as $K_2S_2O_8$ or mole-equivalents of other water soluble peroxides and, when an amine accelerator is used, about 0.1 to 5 g of such an amine, e.g. N-tetramethyl ethylenediamine (TEMED) or mole-equivalent quantities of other amine accelerators. These quantities are however not critical provided enough peroxidant is used. The peroxidation can be carried out at 50°–100° C. under stirring in water for about 1 to 24 hrs but these conditions are not critical provided that the reaction is allowed to go to completion.

In the second stage, i.e. the grafting stage, the quantities of olefinic monomers that can be used can vary from approximately 0.01 mole-equivalent to about 0.5 mole-equivalent per gram of carbon black. The quantities of monomers to be used are obviously related to the density of grafting sites on the carbon black particles that varies considerably from one type of carbon black to the other and is generally related to the quinone and phenol function area density on the particles. According to the data of the main manufacturers of carbon black, such quinone and phenol group densities can vary from about 1 to about 3000 $\mu$equiv./g of carbon black which, in view of the aforegiven range of area per gram values (depending on the kind of carbon black) will provide figures ranging from about 0.01 $\mu$equiv./m$^2$ to about 10 $\mu$equiv./m$^2$. Thus, the amount of monomer in the grafting stage will be adapted as a function of the grafting equivalence selected and the grafting site density of the carbon black used.

The amount of peroxide to be used in the polymerization grafting stages depends on the amount of monomer used and can be comprised from about 0.01 g to 0.1 g (counted as $K_2S_2O_8$) per gram of the monomer. Equivalents of other peroxides are also usable. When using also an amine accelerator, for instance TEMED or equivalents of other amine accelerators, quantities of the order of 0.01 to 1 g of TEMED per gram of peroxide (counted as $K_2S_2O_8$) are advantageously usable. All the above reagent ratios and quantities are not critical and can fall short of or exceed the given limits in some cases, provided of course, that the amounts of respective reagents are enough for accomplishing the reactions and not in such excess as becoming non economical.

The aqueous suspension of grafted carbon black of this invention is directly usable for making jet-ink compositions. For this, it is sufficient to add to the suspension the suitable amounts of usual jet-ink additives, such as wetting agents, surfactants and viscosity controlling agents, dyes, mold inhibitors, oxygen absorbers, buffering agents, pH controlling agents. In the present invention, a considerable and unexpected advantage is provided by the presence of the residual homopolymer which was formed during polymerization and grafting. As surfactant products, non ionic compounds such as polyoxyethylene sorbitan monolaurate and the like are preferred. As wetting agents, polyglycols or glycolamines such as diethylene glycol, glycerine, α-thiodiglycol, triethanolamine and N,N-dimethoxy-methyl-2-imidazolidone are suitable. The quantities of such additives will conform to usual practice.

As dyes, CI acid black Nos. 1, 24, 26, 48, 58, 60, 109, 119 and 131 can be used. As mold inhibitors, sodium dehydroacetate, 1,2-benzisothiazolin-3-one, 6-acetoxy-2,4-dimethyl-m-dioxane or formaldehyde can be used. As oxygen absorbers, sodium sulfite, sodium bisulfite can be used. As pH controlling agents, HCl and NaOH can be used.

In addition to the aforementioned use in jet-printing inks, the aqueous dispersion of the invention can be used for many other purposes. Among such purposes, one may recite inks for fountainpen, ballpoint pen, felt pen, intaglio, rotogravure, rotary printing, elastographic printing, typographic printing, rotary news-paper and the like.

The following Examples illustrate the invention.

EXAMPLE 1 (Comparative)

Forty three grams of carbon black (grade "Regal-R", quinone density 2$\mu$ equi./g, CABOT Corp.) were agitated with 300 ml of water and 30 ml of ethanol. Then, 4.3 g of ammonium persulfate and 0.2 g of N-tetraethyl-ethylenediamine (TEMED) were added and the mixture was stirred for 18 hrs at 90° C. Then, 43.2 g of acrylic acid and 1 g of $(NH_4)_2S_2O_8$ were added and the mixture was stirred under reflux at 95°–98° C. for 24 hrs. After cooling, there was obtained a well dispersed suspension of polyacrylic grafted carbon black the solid concentration of which was about 14%. The pH of this solution was about 2 and its viscosity about 45 cP. Dilution with about 200 ml of water provided carbon black dispersion of good opacity and much lower viscosity usable as a printing jet-ink. Upon neutralization with dilute NaOH solution, the viscosity increased.

EXAMPLE 2

Fifteen grams of carbon black (grade "Regal R") in 50 ml of $H_2O$ were agitated for 4 hrs at 95° C. with 1.5 g of $(NH_4)_2S_2O_8$ and 0.1 ml of TEMED after which a solution of 22.5 g of acrylic acid in 41.6 ml of 30% aqueous NaOH solution was added with 2 g of $(NH_4)_2S_2O_8$ and 0.1 ml of TEMED. The mixture was further agitated for 24 hrs at 95° C. Then it was cooled and provided a dispersion (E) of about 20% solid grafted carbon black. The pH was 5.7 and the viscosity 7.1 cP. Lower viscosities with still acceptable opacity (blackness) were obtained by dilution to approximately 10–15% dispersed solids.

The experiment was repeated as described but using 0.3 ml of TRIS-TEMED (TRIS means tris-(hydroxymethyl)-aminomethane) instead of the TEMED in the peroxidation stage and no amine in the polymerization grafting stage. A dispersion (F) of comparable solid concentration was obtained with viscosity 4.9 cP and pH 5.5. It however settled after 3 min sedimentation by centrifugation under 3300 rpm and was considered unacceptable.

Dispersions (G and H) of corresponding concentrations were made exactly as disclosed for dispersions E and F, respectively, but replacing the "Regal-R" carbon black by type "Elftex-5" (Furnace black) carbon black. Dispersion G had a pH of 5.7 and a viscosity in undiluted form of 12.1 cP; it did not settle after 30 min centrifugation. Dispersion H had a pH of 5.4 and a viscosity of 7.1 cP in undiluted form. It settled after 24 min centrifugation. There was no substantial precipitation after 1 year storage at room temperature.

EXAMPLE 3

The experiment of Example 2 was repeated four times (samples I1–I4) using 100 g of water, 15 g of carbon black ("Elftex-5") 1.5 g of $K_2S_2O_8$, 0.3 ml of TEMED and a temperature of 95° C. in the peroxidation stage, and 22.5 g of acrylic acid, 65 ml of 30% NaOH, 2 g of $K_2S_2O_8$, 1 ml of TEMED, and 35-40 hrs boiling temperature (98° C.) in the polymerization grafting stage. The variable was the peroxidation duration which was 1 hr (I1), 2 hrs (I2), 4 hrs (I3) and 6 hrs (I4). No significant differences between the results were found, all dispersions having a pH of 5.8-6.0 and viscosities of about 15-17 cP in undiluted form. Much lower viscosities, with still acceptable opacities, were found with dispersions diluted down to about 5-10% grafted solids.

EXAMPLE 4

The experiments of Example 2 were repeated under the following conditions:

Peroxidation stage: water 100 ml; carbon black ("Elftex-5") 15 g; $K_2S_2O_8$ and TEMED variable according to Table I below; 2 hrs at 95° C.

Grafting and polymerization stage: sodium acrylate from 22.5 g acrylic acid neutralized with 65 ml 30% NaOH; $K_2S_2O_8$ 2 g; TEMED 1 ml; 24 hrs at 98° C. Four samples (J1 to J4) were prepared according to the further data in Table I below and gave corresponding dispersions with viscosities also given in the Table.

TABLE I

| Samples | $K_2S_2O_8$ (g) | TEMED (ml) | Viscosity (cP) |
|---|---|---|---|
| J1 | 1.5 | 0.15 | 13.6 |
| J2 | 2.25 | 0.23 | 18.7 |
| J3 | 3.0 | 0.30 | 15.3 |
| J4 | 3.75 | 0.38 | 18.0 |

Upon dilution with water to provide 5-10% solid low viscosity aqueous dispersions, the above samples still had acceptable opacities and settling times.

EXAMPLE 5

Experiments (K1 to K4) similar to those reported in Example 4 were performed under the following conditions, except for the $K_2S_2O_8$ and TEMED used in the second stage which were as indicated in the next Table II.

Peroxidation stage: water 100 ml; carbon black ("Elftex-5") 15 g; $K_2S_2O_8$ 3 g; TEMED 0.3 ml; 2 hrs at 95° C.

Grafting and polymerization stage: Na acrylate from 22.5 g of acrylic acid neutralized with 65 ml of 30% NaOH solution; $K_2S_2O_8$ and TEMED see Table II; 48 hrs at 98° C. The remaining data and results are recorded in the next Table.

TABLE II

| Samples | $K_2S_2O_8$ (g) | TEMED (ml) | Viscosity (cP) |
|---|---|---|---|
| K1 | 1.0 | 0.5 | 10.4 |
| K2 | 1.5 | 0.75 | 17.7 |
| K3 | 2.0 | 1.0 | 19.6 |
| K4 | 2.5 | 1.25 | 16.6 |

Upon centrifugation at 3300 rpm, the settling time for all samples was over 3.5 hrs.

EXAMPLE 6

Experiments like in the previous Examples (samples L1 to L4) were carried out with variable amounts of acrylic monomer, $K_2S_2O_8$ and TEMED in the polymerization grafting stage (see Table III below).

Moreover, the following conditions were used:

Peroxidation stage: water 100 ml; carbon black ("Elftex-5") 15 g; $K_2S_2O_8$ 3 g; TEMED 0.3 g; 2 hrs at 95° C.

Grafting & Polymerization stage: acrylic acid, $K_2S_2O_8$ and TEMED according to Table below; 46 hrs at 98° C.; neutralization NaOH 65 ml of aqueous solution containing required NaOH neutralizing equivalent. The sedimentation time after centrifugation at 3300 rpm is also shown in Table III.

TABLE III

| Samples | Acrylic (g) | $K_2S_2O_8$ (g) | TEMED (ml) | Viscosity (cP) | Centrifugation settling (min) |
|---|---|---|---|---|---|
| L1 | 10 | 0.88 | 0.44 | 6.6 | 30 |
| L2 | 15 | 1.33 | 0.67 | 5.7 | 30 |
| L3 | 22.5 | 2 | 1.0 | 13.7 | >90 |
| L4 | 30 | 2.66 | 1.33 | 27.1 | >90 |

The grafting level for samples L1 and L2 was considered borderline to achieve optimal conditions of opacity and viscosities. (for opacity measurements, see for instance Example 9)

EXAMPLE 7

The importance of using carbon black types with a high density of grafting sites was evidenced by repeating the experiments of the previous examples with other grades of carbon black, i.e. "Regal-R" (2 μequiv. of quinone sites/g) and "Vulcan 6" (70 μequiv. of grafting sites/g). Pertinent data on both the peroxidation and grafting stages are outlined below in Tables IV and V. In the Tables a previous sample (L3 from Example 6) is included for comparison. Except for the specific data reported in the Tables, the other conditions were as disclosed in Example 5.

TABLE IV

| | (peroxidation) | | |
|---|---|---|---|
| Sample (no) | Carbon black type and quantity (g) | Quinone conc. (μeq./g) | specific surface ($m^2$/g) |
| L3 | Elftex-5 (15) | 18 | 74 |
| L5 | Regal-R (13.9) | 2 | 80 |
| L6 | Vulcan-6 (9.7) | 70 | 115 |
| M3 | Vulcan-6 (15) | 70 | 115 |

TABLE V

| | (Polymerization & Grafting) | | |
|---|---|---|---|
| Sample (No) | Viscosity of grafted solution (cP) | Centrifugation settling at 3300 rpm (hrs) | Optical density |
| L3 | 13.7 | >2.5 | 1.40-1.45 |
| L5 | 6.3 | <0.5 | 0.96-0.98 |
| L6 | 6.7 | >2.5 | 1.15-1.22 |
| M3 | 18.8 | >2.5 | 1.44-1.48 |

The data of Table V show that using carbon black with high specific surfaces provides more favorable combinations of high optical density and low dispersion viscosity.

EXAMPLE 8

A sample of grafted carbon black was prepared under the same conditions pertaining to sample L6 in Example 7 but varying the grafting and polymerization duration. The other general reaction parameters are listed below:

Peroxidation stage: water 100 g; carbon black ("Elftex-5") 15 g; K$_2$S$_2$O$_8$ 3 g; TEMED 0.3 ml; 2 hrs at 95° C.

Grafting & Polymerization: acrylic acid 22.5 g; neutralization 30% NaOH 65 ml; K$_2$S$_2$O$_8$ 2 g; TEMED 1 ml; temperature 98° C.; duration see below.

| Grafting and polymerization duration (hrs) | Viscosity of suspension (cP) |
| --- | --- |
| 0 | not measured |
| 5 | 12.2 |
| 21 | 13.3 |
| 45 | 13.4 |
| 69 | 17.5 |
| 91 | 18.8 |

From the above data, it can be seen that acceptable viscosities (i.e. degree of grafting) are obtained after about 5 hrs reaction time. Reaction periods over about 60–70 hrs will unduly raise the viscosity without much improvement to the grafting yield.

EXAMPLE 9

A sample of aqueous dispersion of grafted carbon black ("Elftex-5") similar to sample L3 (see Example 6) was diluted with water until its content in grafted carbon black was approximately 5–15% by weight. Then various preparations of such sample were mixed with usual jet-printing ink ingredients according to Table VI below. The viscosity, optical density and surface tension parameters were measured and are also gathered in Table VI. All solutions passed quickly through a 10μ mesh filter and slowly (but still acceptably) through a 1μ mesh filter. Optical densities above about 0.80 are considered acceptable for a jet-print ink.

Opacities were measured as follows: about 0.5 to 1 g of the ink composition was placed on a piece of jet-print paper and spread to a layer of 15μ with a suitably calibrated doctor's blade. The film was allowed to dry in air at room temperature for about 30 sec and the opacity was measured according to usual standards with a McBeth densitometer.

TABLE VI

| Sample of ink | L32 | L31 | L305 |
| --- | --- | --- | --- |
| Solution (ml) | 103 | 51.5 | 77.25 |
| Ethylene glycol (g) | 8 | 4 | 2.75 |
| Water (ml) | — | — | 25 |
| 10% aqueous glycol (ml) | — | 55.5 | — |
| Tween 20 (10% aqueous polyalkylene sorbitan monolaurate) | 16 | 10 | 15 |
| Viscosity (cP at 21° C.) | 7.5 | 5.1 | 6.0 |
| Surface tension (dyne/cm) | 38 | 37 | 38 |
| Optical density (15/u wet ink film) | 1.45 | 0.86–0.94 | 1.08–1.12 |

We claim:

1. A stable aqueous dispersion or suspension of carbon black the particles of which are grafted with chemically bonded water soluble polyolefinic chain residues selected from alkali metal and ammonium polyacrylates the dispersed carbon black solid content of which is from about 5 to 15% by weight and the viscosity is from about 2 to 30 cP at room temperature.

2. The dispersion of claim 1, in which the pH is 5 to 9.

3. The dispersion of claim 2 which has an optical density of 0.8 to 1.5 as measured on a dry film obtained from a 15μ wet film of dispersion with 5–15% by weight of grafted carbon black.

4. The dispersion of claim 2, wherein the quantity of water solubilizing grafted polymer or copolymer chain residues is from about 0.1 to 2 mg by square meter of the carbon black particles area.

5. The dispersion of claim 2, wherein the average number of monomer units polymerized together in the grafted chain residues is from about 20 to 200.

6. The dispersion of claim 2, having a filterability though a 10μ mesh screen of 1–30 ml/min and though a 1μ mesh screen of 0.1–10 ml/min.

7. The dispersion of claim 2, wherein the carbon black is selected from thermal black, lamp black, channel black and furnace black.

8. The dispersion of claim 2, which contains in addition from 0.1 to 20% by weight of ungrafted homo- or copolymer the latter acting as a binder.

9. A method for the preparation of the suspension of claim 1, comprising (1) heating carbon black in water with a peroxide under agitation until the quinone and phenol radical quencher functions at the surface of the carbon particles have been inhibited and converted into grafting sites, then (2) adding at least one suitable radical polymerizable water solubilizing monomer, selected from the group consisting of alkali metal and ammonium acrylates and effecting a simultaneous polymerization and grafting of said monomer on the carbon black particles in the presence of a water-soluble peroxide radical polymerization initiator.

10. The method of claim 9, wherein there is used, in addition to the water-soluble peroxide, a radical polymerization amine accelerator.

11. The method of claim 10, wherein the amine accelerator is selected from N,N-tetraalkyl-ethylenediamine and N,N',N''-pentaalkyl-diethylenetriamine.

12. The method of claim 9, wherein the water-soluble peroxide is selected from ammonium and alkali metal persulfates, perborates, perphosphates, and alkali metal peroxides.

13. The method of claim 12, wherein the water-soluble peroxide is (NH$_4$)$_2$S$_2$O$_8$, K$_2$S$_2$O$_8$ or Na$_2$S$_2$O$_8$.

14. The method of claim 9, wherein the weight ratio of water-soluble peroxide to carbon black in the peroxidation stage (1) is about 0.1 to 0.5.

15. The method of claim 9, wherein the average density of the grafting sites on the selected carbon black before peroxidation is from about 1 to 3000μ equivalents per gram of particles.

16. The method of claim 15, wherein the weight ratio of polymerizable monomer to carbon black is approximately 0.5 to 30.

17. The method of claim 16, wherein the amount of water-soluble peroxide in stage (2) is about 0.01 g to 0.1 g per gram of monomer.

18. The method of claim 12, wherein the amount of amine initiator is about 0.01 to 1 g per gram of peroxide.

19. The method of claim 9, wherein the temperature of steps (1) and (2) is from about 50° to 100° C. under ordinary pressure.

20. The method of claim 9, wherein the duration of step (2) is approximately 1 to 60 hrs.

21. A method for making jet-ink formulations, comprising the step of adding to said dispersion, defined in claim 1 wetting agents, surfactants, viscosity controlling agents, dyes, mold inhibitors, oxygen absorbers, or pH controlling agents.

22. A method for making jet-ink formulations comprising the step of adding to said dispersion defined in claim 8 wetting agents, surfactants, viscosity-controlling agents, dyes, mold inhibitors, oxygen absorbers, or pH-controlling agents, the residual ungrafted homopolymers present acting as an adhesive for the ink on the printed surface and as a cohesive agent for the carbon black particles.

* * * * *